March 27, 1928.

S. O. WHITE ET AL 1,663,785

AUTOMOBILE BRAKE

Filed April 28, 1926     2 Sheets-Sheet 1

INVENTOR.
Samuel O. White and
Robert S. Plexico,

BY

Hood & Hahn.

ATTORNEYS

March 27, 1928.

S. O. WHITE ET AL

AUTOMOBILE BRAKE

Filed April 28, 1926

INVENTOR.
Samuel O. White and
Robert S. Plexico,
BY
Hood + Hahn.
ATTORNEYS

Patented Mar. 27, 1928.

1,663,785

UNITED STATES PATENT OFFICE.

SAMUEL O. WHITE AND ROBERT SPRATT PLEXICO, OF MUNCIE, INDIANA, ASSIGNORS TO WARNER GEAR COMPANY, OF MUNCIE, INDIANA, A CORPORATION OF INDIANA.

AUTOMOBILE BRAKE.

Application filed April 28, 1926. Serial No. 105,123.

Our invention relates to improvements in brakes for automobiles and particularly to that type of brake which is applied to the transmission shaft of the automobile and which is mounted on the transmission gear case. It is one of the objects of our invention to provide operating means for this type of brake which while serving to manipulate the brake and clamp the brake band upon the drum has no tendency to distort the brake band and thereby cause the same to bind unequally on the drum.

For the purpose of disclosing our invention we have illustrated one embodiment thereof in the accompanying drawings in which Fig 1 is a side elevation of the rear end of a transmission casing having a brake band and its operating mechanism thereon;

Figure 1:
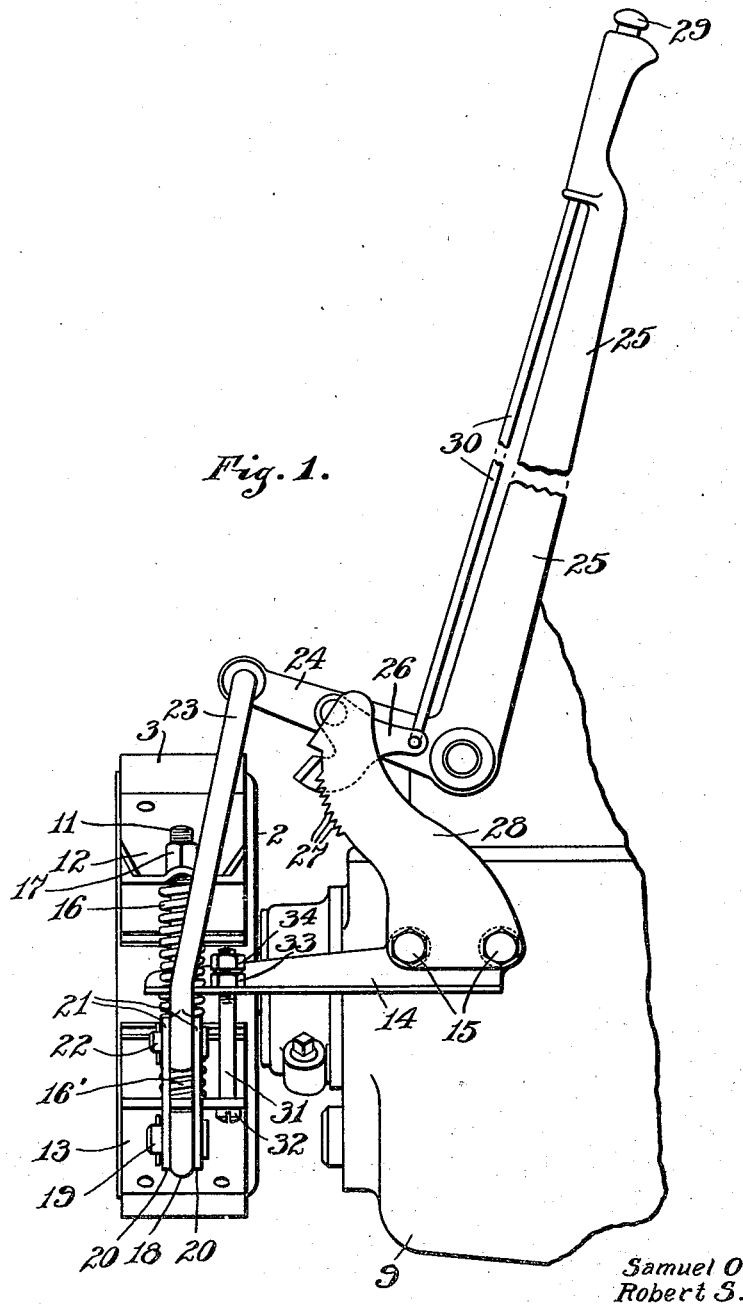
Figure 2:
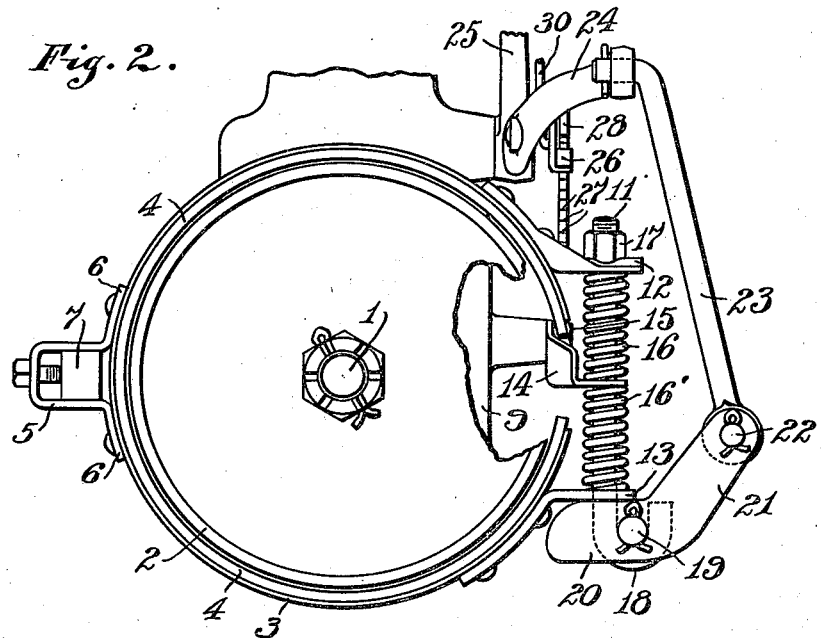
Fig. 2 is an end elevation.
Figure 3:
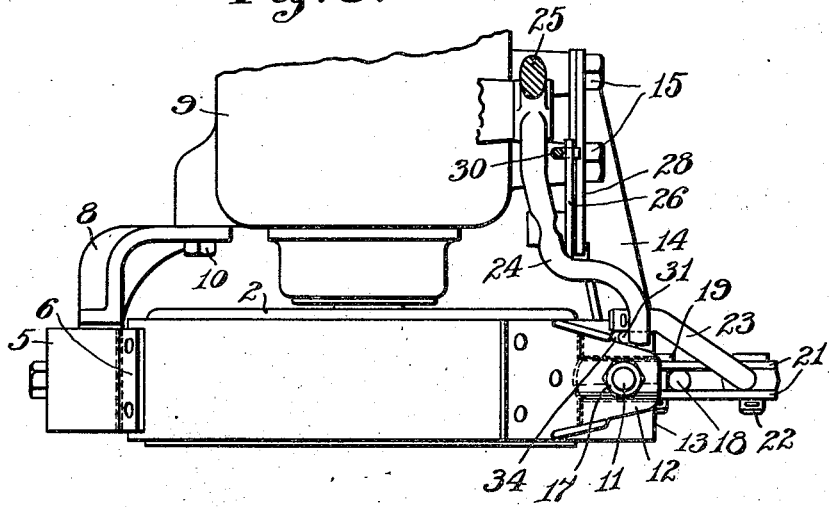
Fig. 3 is a plan view.

In the embodiment illustrated the transmission shaft 1 of the automobile has mounted thereon and transversely of its axis a braking drum 2. Surrounding this brake drum is a brake band consisting of the usual metallic band 3 provided with a friction lining 4. The back of the band 3 intermediate of its ends is provided with a U shaped anchor clip 5 the legs of which are flared outwardly as at 6 and secured to the band 3. This clip receives the end 7 of a supporting bracket 8 secured to the rear wall of the transmission housing or casing 9 by means of suitable cap screws 10.

The free ends of the band are adapted to be contracted, for braking purposes, and to this end we provide a compression bolt 11 which passes through ears 12 and 13 on the respective ends of the band 3. This bolt passes through the free end of a bracket 14 the opposite end of which is secured to the side of the transmission casing by suitable cap screws 15. Interposed between the bracket 14 and the ears 13 and 12 on the brake band are coiled spreading springs 16 and 16' which surround and are kept in place by the bolt 11 and serve to separate the free ends of the band.

The bolt 11 at its top is provided with a bearing nut 17 adapted to bear upon the ear 12 and at its lower end this bolt is bent back upon itself to form a hooked end 18 engaging a pin 19 passing through a cam arm 20 of a bell crank lever. This cam arm bears upon the bottom of the ear 13. The bell crank lever is formed preferably from stampings each provided with a cam arm 20 and an opposite arm 21. These stampings are separated to receive between them the pin 19 as well as the hooked end 18 and the arm 21 is provided with a pin 22 passing through an eye, interposed between the two stampings, of a link 23 the opposite end of which is connected to an arm 24 of the brake handle 25 which brake handle is pivoted on the side of the transmission casing. The arm 24 is provided with a pivoted dog 26 adapted, as the arm 24 is rocked downwardly, to engage in the ratchet teeth 27 on a bracket arm 28 to lock the arm in any depressed position to which it may be moved. This dog is released by the usual releasing handle 29 on the brake lever 25 connected with the dog by a rod 30.

The operation of the brake is obvious. As the end of the arm 24 is depressed by pulling on the brake lever 25 the cam lever receives a corresponding depressing movement at its outer end causing the inner end of the arm 20 to fulcrum on the ear 13 and the pin 19 to be moved downwardly thereby drawing downwardly the compression bolt 14, moving the ear 12 downwardly while at the same time there is a tendency to move the ear 13 upwardly thereby contracting the band 3 on the brake drum 2. It is noted that while the movement of the brake arm 25 is in a plane parallel with the axis of the brake band, the force exerted on the cam lever is in a direction transverse to the axis of the brake band or in a plane parallel with the vertical plane of the band so that there is no tendency to twist the band during the braking operation.

For the purpose of supporting the free end of the brake band to prevent the same from sagging we provide a supporting link in the form of a bolt 31 passing through the ear 13 and through the bracket 14. The ear rests upon the head 32 of the bolt and the bolt is supported from the bracket by an adjustable nut 33 locked in its adjusted position by a lock nut 34. The bolt is perfectly free to move vertically but the arrangement is such that the weight of the free ends of the brake band is supported by this bolt and the band thus prevented from sagging. This permits of a very close adjustment of the band relatively to the drum. Furthermore the bolt 31 takes the first down thrust occasioned by applying the brake. Due to the link connection 23 between the rocking cam arm 21 and the brake lever when the lever is first moved to an on position there is a down thrust on the bolt 11 and through this bolt and the spring 16' on the ear 13. The bolt 31 takes this down thrust and permits the cam arm 20 to rock upwardly drawing the two free ends of the band together.

We claim as our invention:

1. The combination with a transmission casing and shaft, of a brake drum on said shaft, a brake band for said drum mounted on the end of said casing, a compression bolt having one end connected to one end of said band, a cam lever fulcruming on the opposite end of said band and pivotally connected to the opposite end of said bolt and operating in the plane of said band, a guide bracket for the bolt secured on one side of the transmission casing, expansion springs for the band surrounding said bolt and interposed between the bracket and the opposite ends of the band, a bell crank brake lever pivoted on the transmission casing on the same side of the axis of the band as that of the ends of the band and operating in a plane at right angles to the plane of the drum, one arm of said brake lever extending toward the brake band and to a point substantially above the compression bolt, and and a thrust rod pivotally connected at one end to said arm and at the opposite end to said cam lever.

2. The combination with a transmission casing and a shaft, of a brake drum on said shaft, a brake band for said drum mounted on one end of the casing, a compression bolt connected at one end to said band, a cam lever pivotally connected to the opposite end of said band and operating in the plane of the band, means for supporting one of the free ends of the band, a bell crank brake lever pivoted on the transmission casing on the same side of the axis of the band as the ends of the band and operating in a plane at right angles to the plane of the drum, one arm of said brake lever extending rearwardly toward the brake band to a point substantially above the compression bolt and a thrust rod pivotally connected at one end to said arm and at the opposite end to said cam lever.

3. The combination with a transmission casing and shaft, of a brake drum on said shaft, a brake band for said drum mounted on the end of said casing, a compression bolt adjustably connected at one end to said band, a cam lever pivotally connected to the opposite end of said bolt for fulcruming on the opposite end of the band and operating in the plane of the band, an adjustable support for said opposite end of the brake band, a bell crank brake lever pivoted on the transmission casing on the same side of the axis of the band as that of the free ends thereof and operating in a plane at right angles to the plane of the drum, one arm of said brake lever extending rearwardly toward the brake band to a point above the free ends thereof and a thrust rod pivotally connected at one end to said arm and at its opposite end to said cam lever.

In witness whereof, we have hereunto set our hands at Muncie, Indiana, this 22nd day of April, A. D. one thousand nine hundred and twenty six.

SAMUEL O. WHITE.
R. SPRATT PLEXICO.